US009228342B2

(12) United States Patent
Lewcock et al.

(10) Patent No.: US 9,228,342 B2
(45) Date of Patent: Jan. 5, 2016

(54) BEAM ATTACHMENT SYSTEM

(75) Inventors: Keith Lewcock, Wiltshire (GB); Peter Bailey, West Sussex (GB)

(73) Assignee: SPECIALIST STRUCTURES LTD, Wiltshire (GB)

( * ) Notice: Subject to any disclaimer, the term of this patent is extended or adjusted under 35 U.S.C. 154(b) by 297 days.

(21) Appl. No.: 13/388,964

(22) PCT Filed: Aug. 5, 2009

(86) PCT No.: PCT/GB2009/001926
§ 371 (c)(1),
(2), (4) Date: May 15, 2012

(87) PCT Pub. No.: WO2011/015799
PCT Pub. Date: Feb. 10, 2011

(65) Prior Publication Data
US 2012/0216479 A1    Aug. 30, 2012

(51) Int. Cl.
| E04B 2/00 | (2006.01) |
| E04B 2/76 | (2006.01) |
| E04B 1/24 | (2006.01) |
| E04C 3/08 | (2006.01) |
| F16B 7/04 | (2006.01) |
| E04B 2/74 | (2006.01) |
| E04C 3/04 | (2006.01) |

(Continued)

(52) U.S. Cl.
CPC . *E04B 2/766* (2013.01); *E04B 1/24* (2013.01); *E04B 2/7455* (2013.01); *E04C 3/08* (2013.01); *F16B 7/0473* (2013.01); *E04B 2/7451* (2013.01); *E04B 2001/2475* (2013.01); *E04B 2001/405* (2013.01); *E04B 2001/5875* (2013.01); *E04C 2003/046* (2013.01); *E04C 2003/0421* (2013.01); *E04C 2003/0439* (2013.01); *E04C 2003/0465* (2013.01); *E04C 2003/0491* (2013.01)

(58) Field of Classification Search
CPC ............... E04B 2/7451; E04B 2/766; E04B 2001/2475; E04B 2001/5875; F16B 7/0473; E04C 2003/046
USPC ......... 52/582.2, 584.1, 578, 588.1, 71, 282.2, 52/656.9, 586.2, 590.1, 589.1, 585.1, 590, 52/611, 647, 649.2, 846, 710; 403/403, 403/230, 231, 241, 292, 295, 205, 375, 188, 403/189, 170; 248/225.11, 223.41, 223.21
See application file for complete search history.

(56) References Cited

U.S. PATENT DOCUMENTS 3,901,612 A * 8/1975 Canin .......................... 403/189
4,073,113 A * 2/1978 Oudot et al. .................... 52/710
(Continued)

FOREIGN PATENT DOCUMENTS

DE    10 2004 032076 A1    1/2006
EP         1 036 946 A2      9/2000
(Continued)

*Primary Examiner* — Chi Q Nguyen
(74) *Attorney, Agent, or Firm* — Cooley LLP

(57) ABSTRACT

A system for attachment of a fitting to an extruded beam comprises a beam including an upstanding longitudinally-disposed neck having a head comprising laterally-extending flange elements and co-operating attachment means for mounting the fitting, in which the attachment means comprise clamp elements which in use engage the neck of the longitudinally-disposed member from each side thereof, underneath the flange elements, when a clamping force is applied.

8 Claims, 6 Drawing Sheets

(51) Int. Cl.
*E04B 1/38* (2006.01)
*E04B 1/58* (2006.01)

(56) References Cited

U.S. PATENT DOCUMENTS 4,194,333 A * 3/1980 Paton et al. .................... 52/235
5,483,780 A * 1/1996 Stumpf ........................ 52/650.3
6,481,177 B1 * 11/2002 Wood ........................... 52/656.9
6,751,914 B2 * 6/2004 Zeh et al. ........................ 52/239
2002/0023391 A1 2/2002 Nymark

FOREIGN PATENT DOCUMENTS

| FR | 2 699 234 | 6/1994 |
| WO | WO 2004/033813 A1 | 4/2004 |
| WO | WO 2008/097098 A2 | 8/2008 |

* cited by examiner

BEAM ATTACHMENT SYSTEM

CROSS-REFERENCE TO RELATED PATENT APPLICATIONS

This application is the U.S. national phase application of PCT Application No. PCT/GB2009/001926 filed Aug. 5,2009,of which is incorporated herein by reference in its entirety.

This invention relates to a means by which fittings can be rigidly connected to extruded beams so as to maximise the attachment clamping force and slip resistance.

Framework systems require beam members to be rigidly coupled. Beams are typically extruded in aluminium and include features like "T" slots that enable external fittings to be attached.

Whereas "T" slots and their insert counterparts are a simple solution, they rely on the tensile capabilities of fasteners to effect their clamping power. This may be inadequate when the attachment point has to be able to resist axial slip, as the effective co-efficient of friction limits slip resistance to a small factor of the clamping force. Also as all the load is on the thread, a thread failure could be catastrophic when employed on large structures.

It is an object of this invention to be able to attach fittings to extruded features with very high clamping forces.

It is a further object of this invention that such fittings can be attached with minimum preparation to the extruded beam feature.

It is a further object of this invention that the system can be retro-fitted to work with conventional "T" slot provisions.

It is a further object of this invention that the system is easy to prepare and easy to operate. It is a further object of this invention that the retaining force is not solely dependent on the thread of the employed fasteners but rather once attached becomes supported by the mating sections themselves and is thereby failsafe.

The adoption of the "T" slot for linking accessories to extruded beam sections is almost universal. However it is far from ideal. The only simple way of clamping to a "T" slot is to insert an element that will be trapped by it and screw a fastener in. But then the coupling will be load limited by the thread of the fastener and the resistance of the slot overhang lips to peeling open.

The invention is defined in the appended claims.

This invention proposes an anchor shape attached to the beam member, with a conforming two part clamp as shown in FIG. 1. The anchor can be gripped from both sides such that as the clamp is pulled together around the anchor by the fasteners, its wedge like tongues insert into the opposing wedge like spaces formed between the beam and the anchor's undercut faces. The wedge effect can generate contact pressures that exceed the fastener loading by an order of magnitude. Even with a low co-efficient of friction there can consequently be a very high resistance to axial slip.

The fastener in this case is being used to establish the wedge preload. Once set, the coefficient of friction between the clamp wedge and anchor holds most of the load, taking the unreliable fastener out of the critical force loop.

This design also confers considerable cost advantages in being able to make high load fittings from low cost extruded sections. Loads into the beam can be taken straight down the shaft of the anchor and webbed into the supporting extrusion.

Where it is desirable to employ such high load fittings on existing structures with more conventional "T" slot provision, an anchor adaptor fitting can be provided to locate in the "T" slot as shown in FIG. 2. In order to allow this to be inserted without requiring any machining away of the top of the slot, such a converter fitting is best formed from 2 similar parts that can be installed separately and then slid together back to back.

Providing a clamping system that is so capable of resisting axial slip and offering equally high tensile loading enables new possibilities for effecting high load support frameworks, whether for automation systems or multi story structures.

A further benefit is that it is easy to operate in the field as clamp parts come pre-assembled and only need tightening.

And of equal importance is the inherently low cost of manufacture as features will principally be extruded in aluminium and will then require a minimum of preparation to become the final part.

With safety attracting an ever greater premium, an attachment system that is significantly immune to fastener thread failure is greatly preferred, particularly as thread forms in aluminium are notoriously unreliable.

Embodiments of the invention will now be described by way of example with reference to the accompanying drawings of which:

FIG. 1 shows an end elevation of the basic anchor system. The anchor shaped feature 3 is attached to an extruded beam with an optional internal brace 4 providing additional support against tensile loads.

Figure 1:
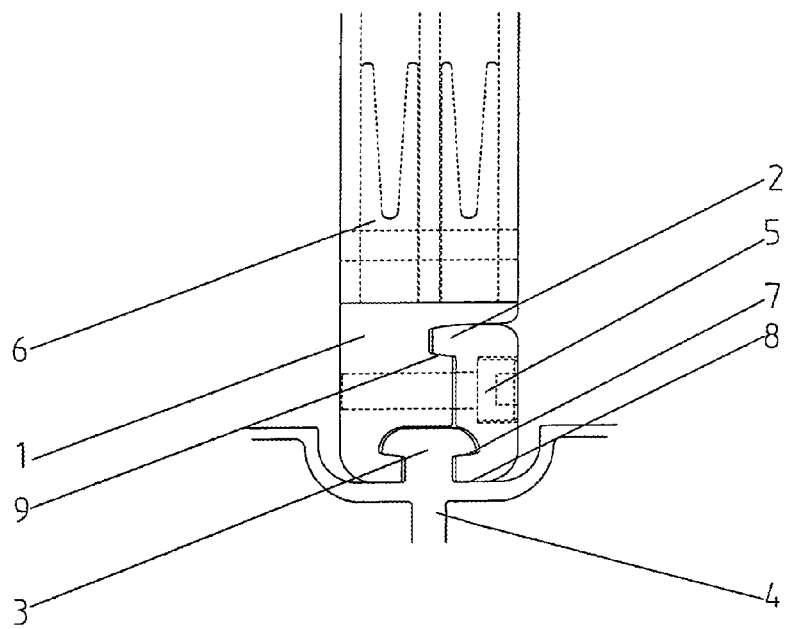
FIG. 1 is an end elevation of a beam attachment.

The two parts of the attached clamp 1 and 2 grip the anchor from both sides and are pre-loaded together by the fastener 5.

The clamp has a tapered face 7 and a flat face 8 which together act as a wedge, jamming under the anchor overhang when the fastener is tightened. Face 7 may also advantageously include a concave form such that the wedge jamming angle reduces the further the wedge inserts under the anchor overhang.

The two parts 1 and 2 also lock together about a further wedge 9, whose faces may be curved such that part 2 can settle at a small range of angles with respect to part 1.

The resulting assembly is not over-constrained so that it locks without slack or ambiguity. If the fastener which in this embodiment is M6 can achieve a tensile loading of about 24 kN with a steel thread insert, this is approximately halved by the reduced leverage resulting from the fastener being mid way between the further wedge 9 and the tapered face 7.However the load on the further wedge and the tapered face is then increased by a factor of about ten resulting from the small wedge angle. With a co-efficient of friction estimated at 0.2 between the anchor and the wedge, the axial slip resistance will be about 24,000*0.5*10*0.2 N, totalling 24 kN. This would reduce to about 10 kN without the steel thread insert.

On an extended say 100 mm length of extrusion, for the anchor to fail under tensile loading it would have to snap off about 8 cm2 of aluminium which at an average extrusion grade would require a force of >80 kN. This is similar to the >70 kN of axial slip resistance achieved from 3 fasteners.

The fitting can be attached to other extruded beams or plates, in this embodiment extending tongues 6 can be bonded into a conforming beam profile.

Figure 2:
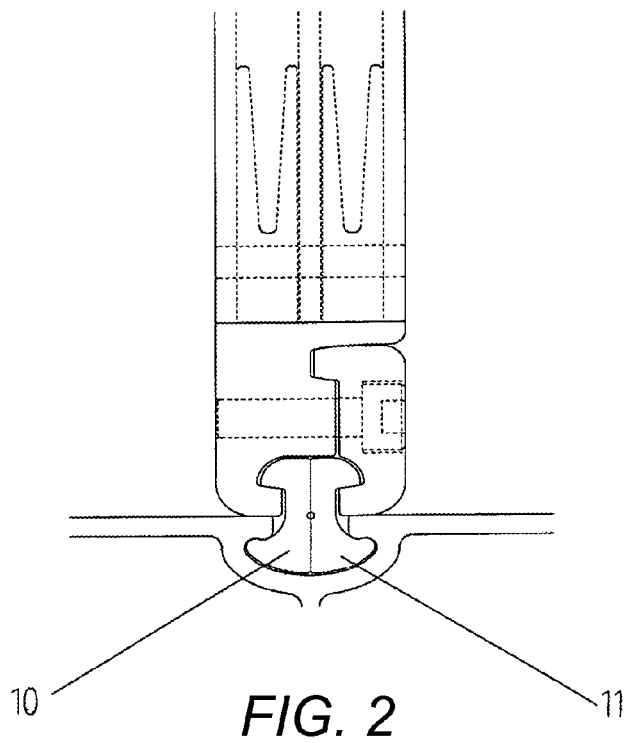
FIG. 2 is an end elevation showing another embodiment of the invention.

FIG. 2 shows the same fitting but this time instead of the anchor section being part of the beam extrusion, two conforming adaptor extrusions 10 and 11 are separately inserted into a conventional "T" slot and slid together back to back to emulate a formed in feature.

This adaptor need not compromise the strength and slip resistance of the assembly compared with the formed in anchor as the clamping load between the adaptor and beam will be the same as the clamping between adaptor and fitting.

Figure 3:
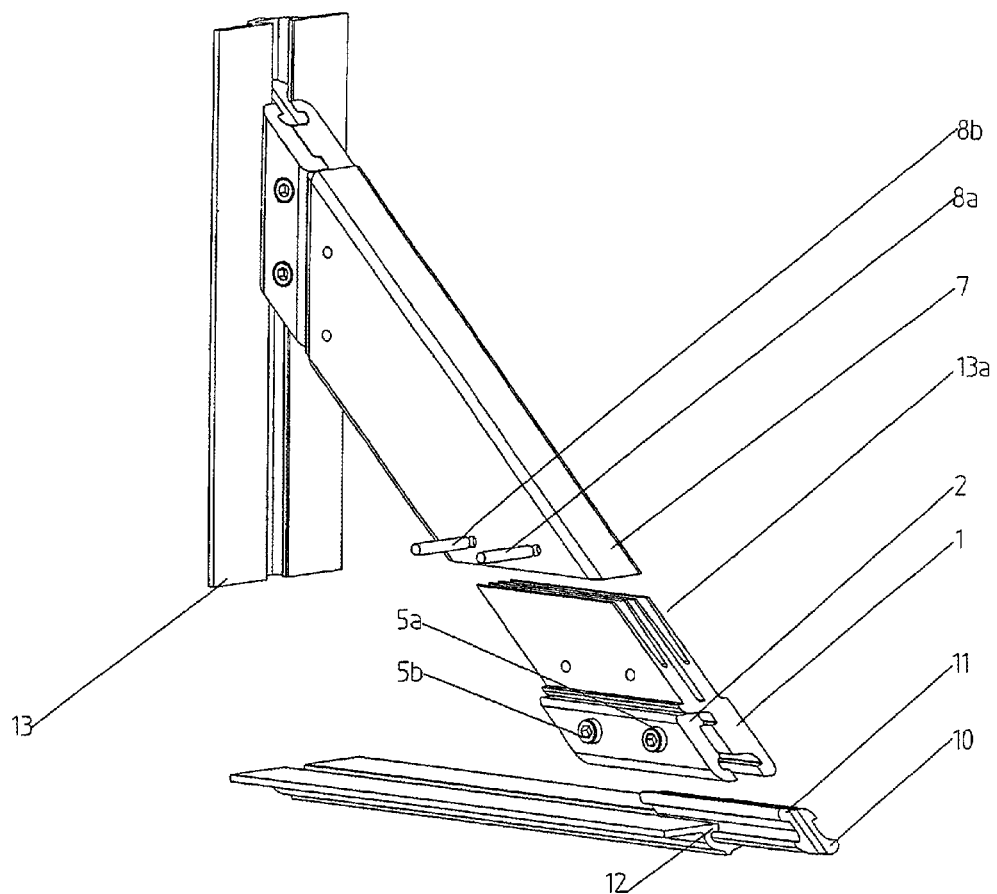
FIG. 3 shows a system according to the invention as part of a corner bracket for holding beams together orthogonally.

FIG. 3 shows two sets of anchor lock fittings attaching to "T" slot adaptors and connected by an extruded beam to form a corner bracket.

The lower component set is exploded to better see the individual elements.

The two back to back adaptor extrusions 10 and 11 are shown partially extracted from a section 12 that forms part of a more substantial beam (not shown). Similarly 13 shows an equivalent slot feature that would be part of a beam (not shown).

The anchor clamp parts 1 and 2 are shown connected by fasteners 5a and 5b, with part 2 shown pulled aside such that they could be fitted around the adaptor anchor.

Part 1 shows the extruded tongues 6 that provide a large bonding surface area to beam 13a. As a further safety precaution, pins 8a and 8b could be inserted through holes drilled through 13a, and 2 and 1.

Figure 4:
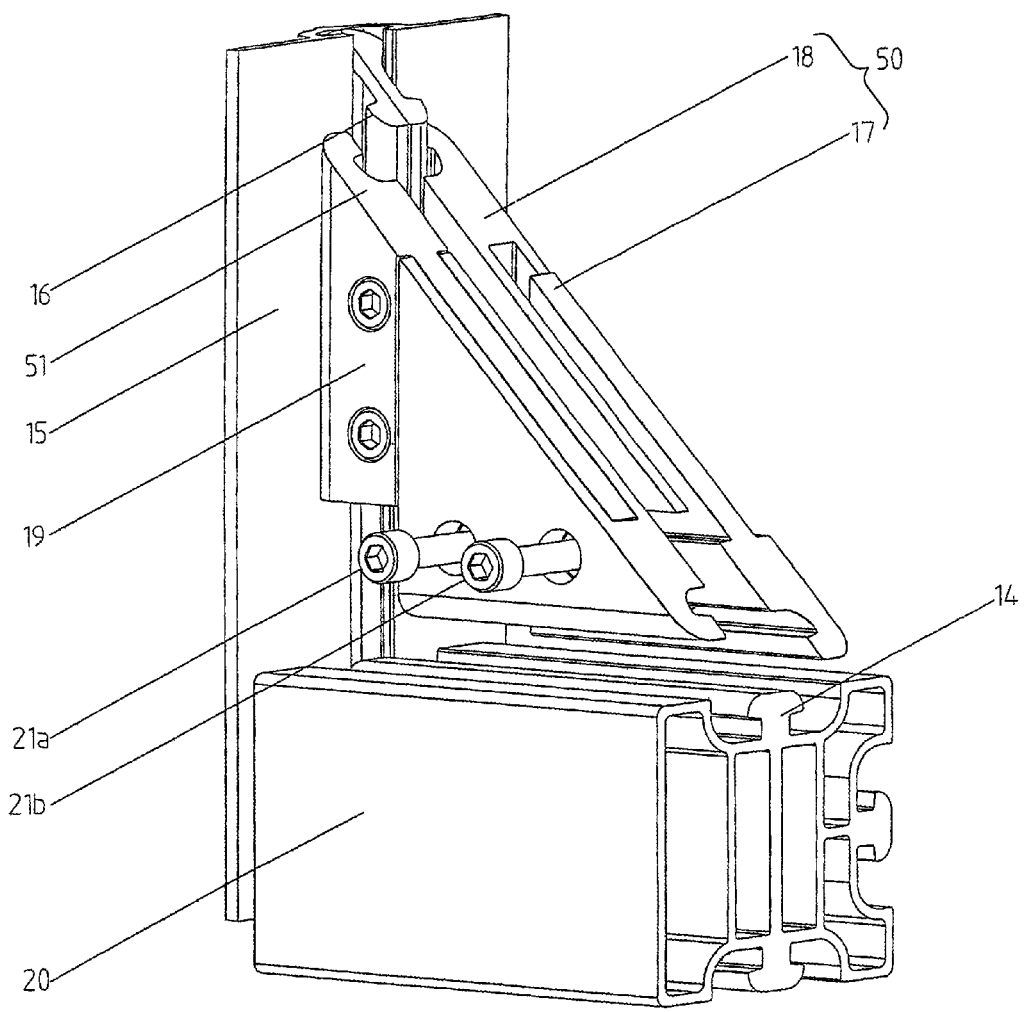
FIG. 4 shows another form of corner bracket.

FIG. 4 shows an embodiment of a small bracket that can be manufactured at low cost as it is fabricated from low cost extrusions that require minimum preparation. The bracket comprises a first bracket part 50 and a second bracket part 51.

Part 20 is a representative beam featuring several anchor elements e.g. 14. The beam will be attached to a further beam whose "T" slot features are shown by 15 with dual back to back adaptors fitted as shown by 16.

The two bracket parts 50, 51 are constructed from tongue and a groove extrusions, which can then be mitred and bonded together as shown by 17 and 18. The bracket parts can then be bolted together around the anchor features 14 and 16 by fasteners e.g. 21a and 21b.

This style of bracket can also be produced with different length extrusions on either side, where for example additional fasteners need to be accommodated to increase the slip resistance.

The bracket could also be produced from simple plates which have the conforming anchor form machined in on orthogonal sides. Two such plates can then be bolted together in a similar style to produce a bracket of virtually any size or aspect ratio.

Figure 5:
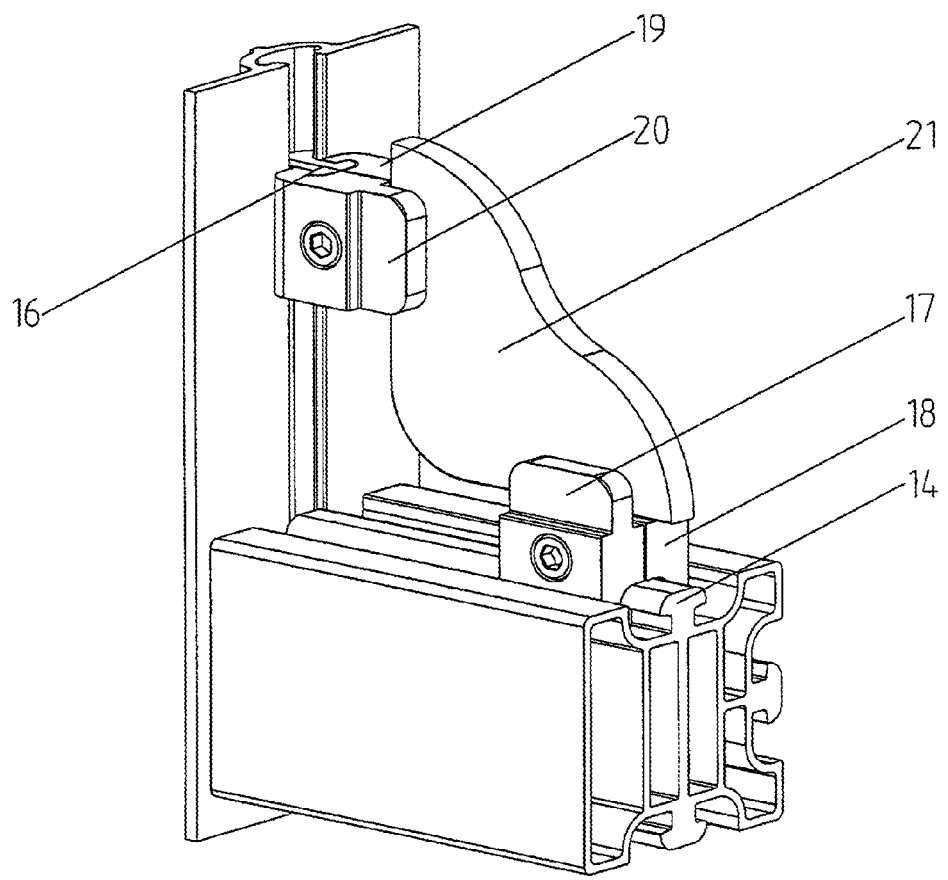
FIG. 5 shows a system according to the invention used for attachment of a plate.

FIG. 5 shows how short cut lengths of clamping profile extrusion can be used to attach various construction system elements.

In this embodiment tags 17 and 18 and tags 19 and 20 are bolted together around extruded anchor feature 14 and anchor adaptors 16 such as to retain plate 21.

Similar constructions could be employed to facilitate a wide range of attachments.

Figure 6:
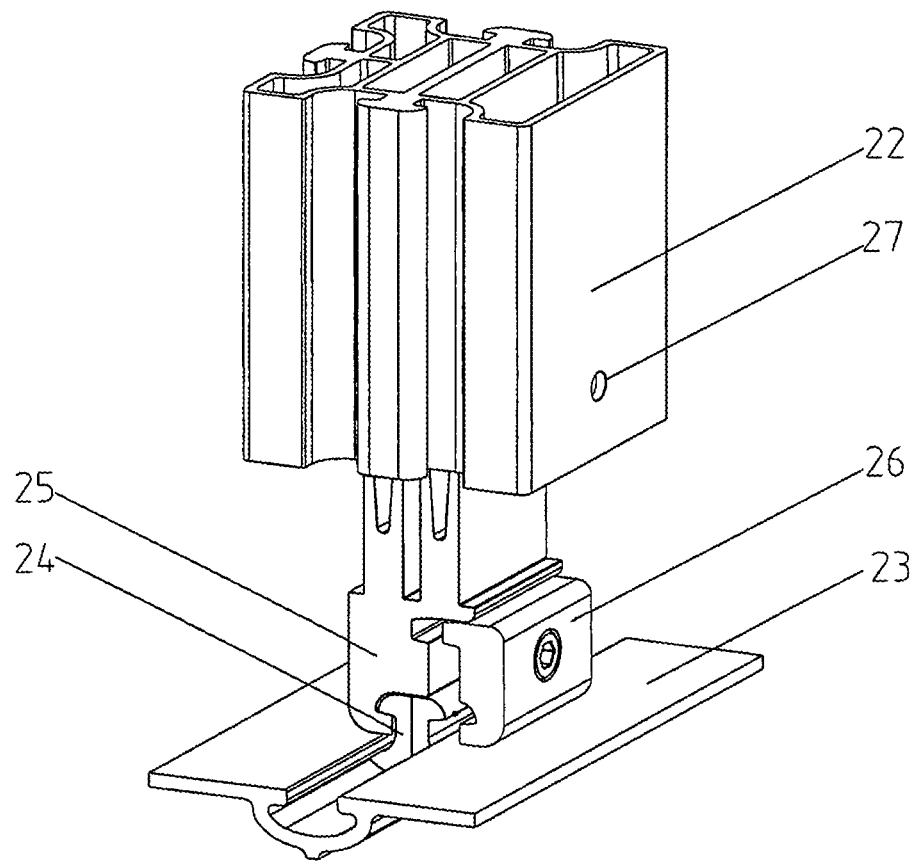
FIG. 6 shows a system according to the invention for attachment of a post to a beam.

FIG. 6 shows how the system can be employed to attach a post to a beam without external features.

Anchor bracket part 26 is attached to part 25 with a suitable fastener. It is then bonded into post 22 which is brought into orthogonal face contact with beam surface 23 that has anchor adaptors 24 inserted into it's "T" slot.

A hole 27 in the post enables a hex key to be inserted to tighten the trapped fastener such that it clamps around the anchor adaptors.

Figure 7:
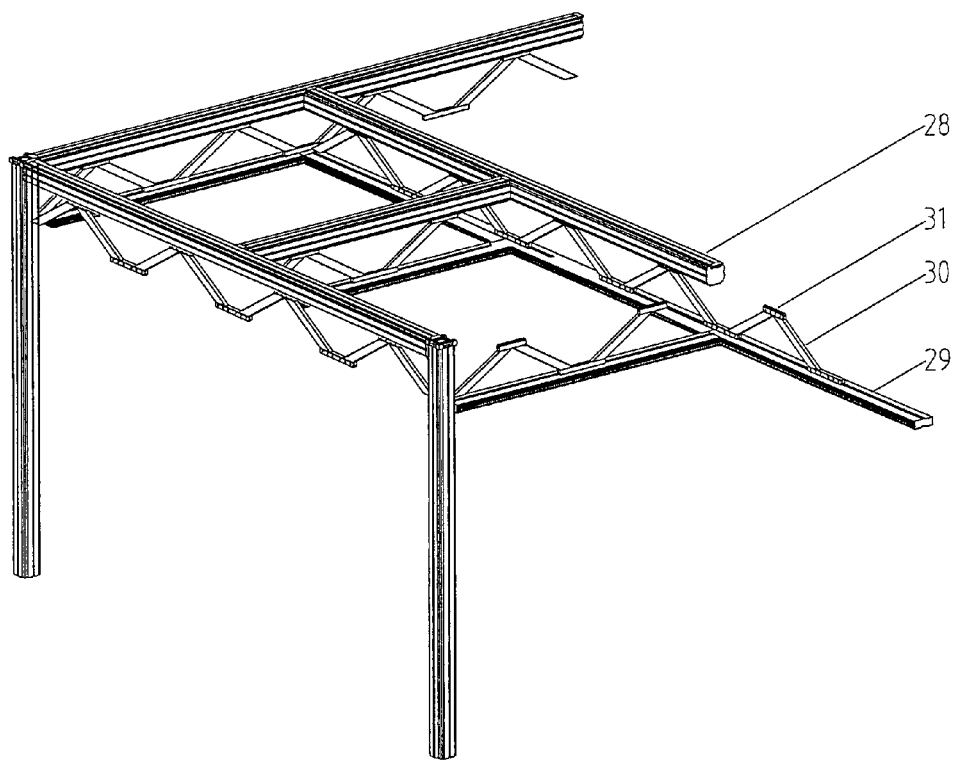
FIG. 7 shows a truss floor system constructed using systems according to the invention.

FIG. 7 shows how the anchor coupling system can be employed to construct a truss floor system.

Beams e.g. 28 and 29 are separated and stiffened into a truss matrix by diagonal cross brace members e.g. 30 using anchor extrusion based fittings e.g. 31.

The invention claimed is:

1. A system for attachment of a fitting to an extruded beam, the system comprising a beam formed with a T-slot, a device including a body member having an upstanding longitudinally-disposed neck and a head comprising laterally-extending flange elements, the body member being configured and arranged for insertion in the T-slot with the neck extending therethrough, and co-operating attachment means for mounting the fitting, in which the attachment means comprise clamp elements which in use engage the longitudinally-disposed neck from each side thereof, underneath the flange elements, when a clamping force is applied, wherein the clamp elements have a sloping upper face to engage under the flange elements of the body member and a flat lower face parallel with the beam, whereby the clamp elements are wedge-shaped to engage into opposing wedge spaces formed between the beam and under the flange elements with jamming as the clamping force is applied.

2. A system according to claim 1, in which the sloping upper face is concave in form.

3. A system according to claim 1, in which the clamp elements include mating tongue and groove formations.

4. A system according to claim 3, in which the mating surfaces of the tongue and groove formations are curved.

5. A system according to claim 1, in which the clamping force for the clamp elements is provided by a threaded fastener.

6. A system according to claim 1, in which the device is formed as a first part and a second part each having a body member, said body members being separately insertable through a longitudinal opening of the T-slot, the first and second parts then being arrangeable back to back with said body members engaged in the T-slot and the neck extending therethrough.

7. A system according to claim 1, in which the co-operating attachment means are embodied in a bracket having respective pairs of clamp elements arranged in mutual orthogonal relationship and the fitting is constituted by a second beam attached to the first beam by means of the bracket.

8. A system according to claim 7, in which the bracket is formed from two plates which are arranged back to back, each plate having orthogonal grooves defining clamp elements.

\* \* \* \* \*